June 28, 1960 R. M. HATCH, JR 2,943,259

PHASE COMPARATOR

Filed Nov. 8, 1957

INVENTOR.
RICHARD M. HATCH, JR.
BY Wade Koontz
ATTORNEY and
Richard J. Killoren
AGENT 2,943,259

PHASE COMPARATOR

Richard M. Hatch, Jr., West Concord, Mass., assignor to the United States of America as represented by the Secretary of the Air Force Filed Nov. 8, 1957, Ser. No. 695,471

1 Claim. (Cl. 324—88)

This invention relates to a phase comparator for radio frequency signals.

One object of the invention is to provide a phase comparator which avoids 180° ambiguity.

Another object is to provide a phase comparator which presents the data instantaneously.

Another object is to provide a phase comparator whose accuracy is independent of the phase.

Still another object is to provide a phase comparator whose accuracy is insensitive to frequency change over a small range.

Figure 1:
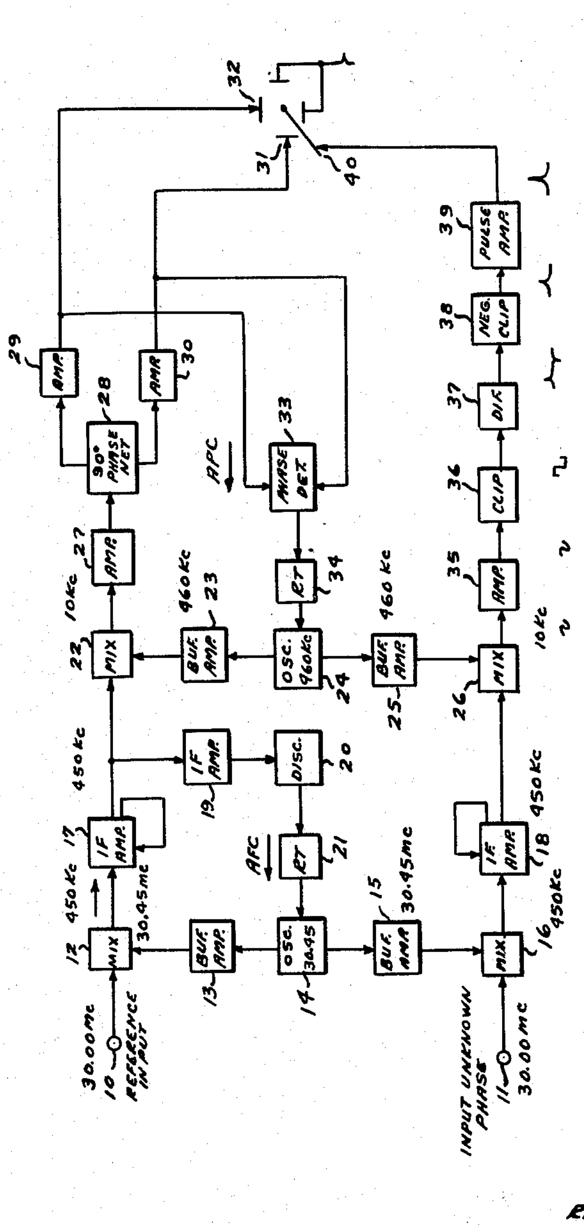
Figure 2:
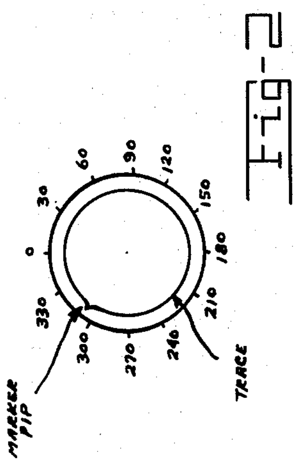

These and other objects will be best understood from the following description when read in conjunction with the accompanying drawings, in which:

Fig. 1 is a circuit diagram in block form of the phase comparator of this invention; and Fig. 2 shows the face of the cathode ray tube of Fig. 1 with a possible pattern shown thereon.

The input signal is shown in the following as nominally 30 mc.; the intermediate frequencies are shown as 450 kilocycles, and 10 kilocycles. These numbers are merely used for examples; any other numbers would do as well. In fact, the input signal frequency herein shown as 30 megacycles may itself be an intermediate frequency preceded by 30 megacycle amplifiers, a UHF or microwave frequency local oscillator, and mixers.

With reference to the block diagram of Fig. 1, a 30 megacycle signal is applied through terminal 10 to mixer 12 togther with a 30.45 megacycle signal from local oscillator 14 through a buffer amplifier 13. The difference frequency, 450 kilocycles, is amplified by an intermediate frequency amplifier 17. Simultaneously, a 30 megacycle signal of identical frequency with the first 30 megacycle signal but of unknown phase relationship is applied through terminal 11 to mixer 16 together with a signal from common local oscillator 14 through buffer amplifier 15. The output from mixer 16 will be of identical frequency with the output from mixer 12 and will bear the same phase relationship as the orignal 30 megacycle signals. The output from mixer 16 is applied to an IF amplifier 18.

A sample of the signal output of IF amplifier 17 is passed through an additional buffer amplifier 19 to a frequency discriminator 20 which controls the reactance tube 21. The reactance tube 21 in turn adjusts the frequency of the local oscillator 14 so as to maintain the IF frequency close to 450 kilocycles, the center frequency of the indentical IF amplifiers 17 and 18.

The output from IF amplifier 17 is applied to mixer 22 together with a signal of approximately 460 kilocycles from oscillator 24 through a buffer amplifier 23. The difference frequency of approximately 10 kilocycles out of mixer 22 is amplified by amplifier 27 and applied to a phase shifting network 28. The two outputs from this phase shifting network should have exactly 90° phase difference and are connected respectively to a horizontal deflection amplifier 29 and a vertical deflection amplifier 30. The outputs from these two amplifiers are applied to the horizontal deflection plate 31 and vertical deflection plate 32 of a cathode ray tube and are simultaneously applied to a phase detector 33. When the two signals applied to the phase detector have exactly a 90° phase relationship the output from the phase detector 33 is zero. Deviation from the 90° relationship will cause the output from the phase detector by means of reactance tube 34 to control the frequency of the oscillator 24. The operation of this circuit will then be to maintain the frequency of the signal out of mixer 22, nominally 10 kilocycles, at exactly that frequency, which produces by means of phase-shifting network 28, a 90° phase relationship between the signals applied to the deflection plates of the oscilloscope tube, thus generating a trace on the scope screen which is an accurate circle.

The signal out of IF amplifier 18, referred to as the unknown phase, is applied to mixer 26 together with a signal from oscillator 24 through buffer amplifier 25. The signal out of mixer 26 thus has a frequency identical to that of the signal out of mixer 23 and will bear a phase relationship identical to that between the two original 30 megacycle signals. The signal out of mixer 26 is applied to an amplifier 35, squaring circuit 36, a differentiator 37, a negative clipper 38, and a pulse amplifier 39. The output from the pulse amplifier 39 is thus a sharp positive pulse at the instant of the positive going zero crossing of the sine wave applied to the amplifier 35. This pulse is applied to a radial deflection anode 40 in the cathode ray tube causing a radial pip on the circular trace.

The operation of the overall circuit is such as to make the accuracy of the phase measurement independent of the exact input frequency. In practice, deviation of the input frequency from 30 megacylces of ±2 megacycles was corrected by the automatic frequency control circuit 19, 20, and 21, so that IF frequencies were very nearly 450 kilocycles. In order for the accuracy of the phase indicator to be independent of the actual phase difference of the input signals, the trace of the scope must remain a perfect circle. This is accomplished by the automatic phase control circuit 33 and 34. If the oscillator 24 were a fixed frequency the difference signals out of mixers 22 and 26 would change slightly with changing input frequencies since the automatic frequency control circuit does not completely correct for this frequency change. The signal out of mixer 22 would then change in frequency so that the phase network would not produce an accurate 90° phase shift and thus an elliptical trace would be produced on the scope. This effect is reduced sufficiently in this apparatus by the automatic phase control circuit so that accuracy of measurement is limited only by the resolution of the trace on the scope screen.

The operation of the phase comparator as designed and planned above is thus such as to produce a pip on the circular trace of the scope, Fig. 2, whose angular position is a measure of the relative phase of the signals applied to terminals 10 and 11 with an accuracy independent of the amplitude of this phase difference and, within limits, independent of the frequency of the input signals.

Further modifications of the invention concepts disclosed herein may now become apparent to those skilled in this art. It will be understood therefore that the scope of the present invention is to be regarded as subject only to those limitations of the appended claim.

What is claimed is:

A device for indicating on the face of a cathode ray tube, having a horizontal deflection means, a vertical deflection means and a radial deflection means the relative phase between a reference radio frequency signal and a second radio frequency signal of the same frequency as said reference signal but of unknown phase, comprising; means for converting each of said radio frequency signals to an intermediate frequency signal with the same relative phase relation as said radio frequency signals, means responsive to the reference intermediate frequency signal for maintaining the intermediate frequency signals at a substantially constant frequency, an intermediate frequency local oscillator, a first and second mixer circuit, means for applying said reference intermediate frequency signal to said first mixed circuit, means for applying the intermediate frequency signal of unknown phase to said second mixer circuit, means for applying the output of said intermediate frequency local oscillator to said first and said second mixer circuits to produce to low frequency signals with the same relative phase as said radio frequency signals, means responsive to the output of said first mixer circuit for producing two signals one 90° out of phase with respect to the other, means for connecting said one signal to said horizontal deflecting means, means for connecting the other signal to the vertical deflecting means to thereby produce a circular trace on the face of said cathode ray tube, a phase detector, means for connecting said two signals with the 90° phase relation to said phase detector, means responsive to the output of said phase detector, means for controlling the frequency of said IF local oscillator to preserve the 90° phase relation of said signals applied to horizontal and vertical deflection means, a clipper circuit connected to the output of said second mixer circuit to convert the low frequency signal of unknown phase to a substantially square wave, means for differentiating said square wave and means for applying only one of the pulses of the differentiated signal to said radial deflecting means to thereby produce a pip on the circular trace to indicate the relative phase of said two radio frequency signals.

References Cited in the file of this patent

UNITED STATES PATENTS

| | | |
|---|---|---|
| 2,320,476 | Schrader | June 1, 1943 |
| 2,422,386 | Anderson | June 17, 1947 |
| 2,481,659 | Guanella | Sept. 13, 1949 |
| 2,576,499 | Bowes | Nov. 27, 1951 |
| 2,580,803 | Logan | Jan. 1, 1952 |
| 2,588,094 | Eaton | Mar. 4, 1952 |
| 2,614,221 | Moll | Oct. 14, 1952 |
| 2,793,347 | Clark | May 21, 1957 |

FOREIGN PATENTS

| | | |
|---|---|---|
| 892,611 | Germany | Oct. 8, 1953 |